Dec. 20, 1960  G. GORDON  2,965,299
APPARATUS FOR DERIVING VOLTAGES THAT ARE APPROXIMATELY
PROPORTIONAL TO PREDETERMINED FUNCTIONS OF ANGLES
Filed Dec. 3, 1954  2 Sheets-Sheet 1

INVENTOR
GEOFFREY GORDON
BY
ATTORNEY

United States Patent Office 2,965,299
Patented Dec. 20, 1960

2,965,299

APPARATUS FOR DERIVING VOLTAGES THAT ARE APPROXIMATELY PROPORTIONAL TO PREDETERMINED FUNCTIONS OF ANGLES

Geoffrey Gordon, Harrow, England, assignor to The General Electric Company Limited, London, England Filed Dec. 3, 1954, Ser. No. 473,000

Claims priority, application Great Britain Dec. 7, 1953

4 Claims. (Cl. 235—186)

The present invention relates to apparatus for deriving voltages that are approximately proportional to predetermined functions of angels, for example to the sine and cosine of angles.

Figure 1:
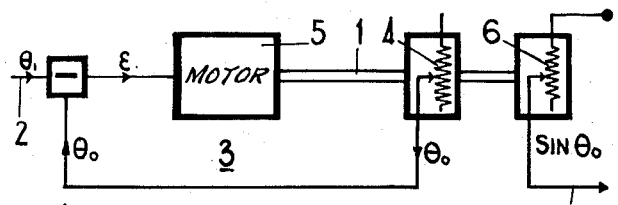

It is known to position the shaft of a sine-cosine potentiometer by means of a servo system. One example of this is shown in Figure 1 of the accompanying drawings and in this arrangement the servo system is of the zero-error type. Referring to this figure, it is required that the shaft 1 shall take up an angular position determined by the voltage supplied over a path 2, this voltage being proportional to the required angle $\theta_1$. The servo system 3 in fact causes the shaft 1 to take up an angular position $\theta_0$, measured from some reference position and a voltage proportional to $\theta_0$ is derived from a potentiometer 4 having a linear characteristic. The shaft is driven by a motor 5 to which is supplied a voltage $\epsilon$ which is equal to $\theta_1 - \theta_0$. The shaft 1 also drives a potentiometer 6 that has a sine characteristic so that when a steady voltage is applied across this potentiometer, the output voltage fed over the path 7 is proportional to $\sin \theta_0$.

With the arrangement shown in Figure 1 it will be realized that under steady state conditions $\epsilon$ to zero so that the output voltage is proportional to $\sin \theta_1$. More generally $$\sin \theta_1 = \sin(\theta_0 + \epsilon)$$
$$= \sin \theta_0 \cos \epsilon + \cos \theta_0 \sin \epsilon \quad (1)$$

If $\epsilon$ is small, $\cos \epsilon$ is approximately equal to unity and $\sin \epsilon$ is approximately equal to zero so that the Expression 1 approximates to $$\sin \theta_0 = \sin \theta_1 \quad (2)$$

In practice it is found that the servo system 3 cannot accurately position the shaft 1 when $\theta_1$ is changing relatively quickly and accordingly there is then an appreciable value of $\epsilon$ which leads to inaccuracy of the output voltage since the above-mentioned approximation is no longer valid.

It has now been realized that a better approximation is to take $\cos \epsilon$ as unity and $\sin \epsilon$ as $\epsilon$. With this approximation the Expression 1 becomes $$\sin \theta_1 = \sin \theta_0 + \epsilon \cos \theta_0 \quad (3)$$

Thus, according to a feature of the present invention, apparatus for deriving a voltage that is approximately proportional to the sine or cosine of an angle $\theta_1$ comprises a servo system of the zero-error type that is arranged to turn a shaft to a position $\theta_0$ in dependence upon the input angle $\theta_1$, first and second potentiometers one of which has a sine characteristic and one a cosine characteristic and which are driven by the said shaft, means for supplying a voltage across one of these potentiometers, means for supplying across the other potentiometer a voltage proportional to the error $\epsilon$ which is equal to $\theta_1 - \theta_0$, and means to add the voltages derived from the first and second potentiometers to give an output voltage that is approximately proportional to $\sin \theta_0 + \epsilon \cos \theta_0$ or $\cos \theta_0 + \epsilon \sin \theta_0$.

The above discussion is concerned with deriving a voltage that is proportional to the sine or cosine of an input angle. In some instances, however, it is desirable to derive a voltage that is proportional to a predetermined function of an input angle and in that case the present invention may be stated more generally as apparatus for deriving a voltage that is approximately proportional to a predetermined function ($f(\theta)$) of an angle $\theta$ comprising a servo system that is arranged to turn a shaft to a position $\theta_0$ in dependence upon an input angle $\theta_1$, a first potentiometer which is driven by said shaft and which has a characteristic that follows the said predetermined function, a second potentiometer which is driven by said shaft and which has a characteristic that follows the differential of the said function with respect to $\theta$, means for supplying a voltage across the first potentiometer, means for supplying across the second potentiometer a voltage proportional to the error $\epsilon$ which is equal to $\theta_1 - \theta_0$, and means to add the voltages derived from the first and second potentiometers to give an output voltage that is approximately proportional to $$f(\theta) + \epsilon \frac{\partial f(\theta)}{\partial \theta}$$

where $\theta = \theta_0$.

The arrangement described above with reference to Figure 1 may be used to derive a voltage that is proportional to the product of a quantity A and the sine of an angle $\theta_1$ since, if a voltage proportional to A is supplied across the potentiometer 6, the output voltage will, allowing for the previously mentioned approximations, be proportional to the required product. In this arrangement the potentiometer 6 effectively carries out the required multiplication, but it will be realized that, if the better approximation given by the Expression 3 is to be used, it is necessary for the output voltage to contain a component proportional to the term $A \epsilon \cos \theta_0$. This term is a triple product and requires a more complicated form of apparatus.

Thus, according to another feature of the present invention, apparatus for deriving a voltage that is approximately proportional to the product of the quantity A and the sine or cosine of an angle $\theta_1$ comprises a first servo system of the zero-error type that is arranged to turn a first shaft to a position $\theta_0$ in dependence upon the input angle $\theta_1$, means to derive a quantity proportional to the error $\epsilon$ which is equal to $\theta_1 - \theta_0$, a second servo system which is arranged to turn a second shaft in dependence upon the quantity $\epsilon$ or A, first and second potentiometers one of which has a sine characteristic and the other a cosine characteristic and which are arranged to be driven by the first shaft, a third potentiometer which has a linear characteristic and which is arranged to be driven by the second shaft, means for supplying a voltage proportional to the quantity A across the first potentiometer, means for supplying a voltage proportional to the quantity A or $\epsilon$ (whichever is not utilized to control the second servo system) across the third potentiometer, means for supplying the voltage derived from the third potentiometer across the second potentiometer, and means to add the voltages derived from the first and second potentiometers to give an output voltage approximately proportional to either $A(\sin \theta_0 + \epsilon \cos \theta_0)$ or $A(\cos \theta_0 + \epsilon \sin \theta_0)$.

Preferably the second servo system is of the zero-error type.

Three arrangements of apparatus in accordance with the present invention will now be described by way of example with reference to Figures 2, 3 and 4 respectively of the accompanying drawings. For ease of reference, corresponding parts in Figures 1, 2 and 3 are given the same reference numerals.

Figure 2:
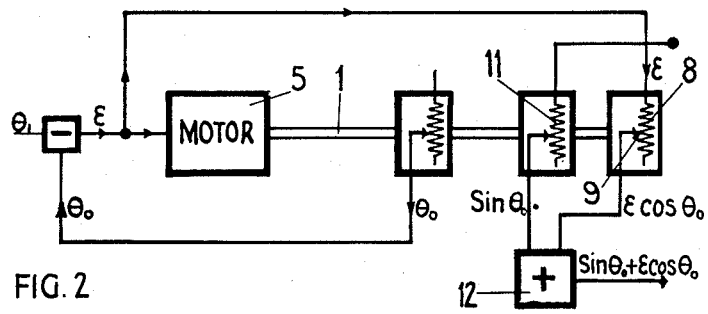
Figure 3:
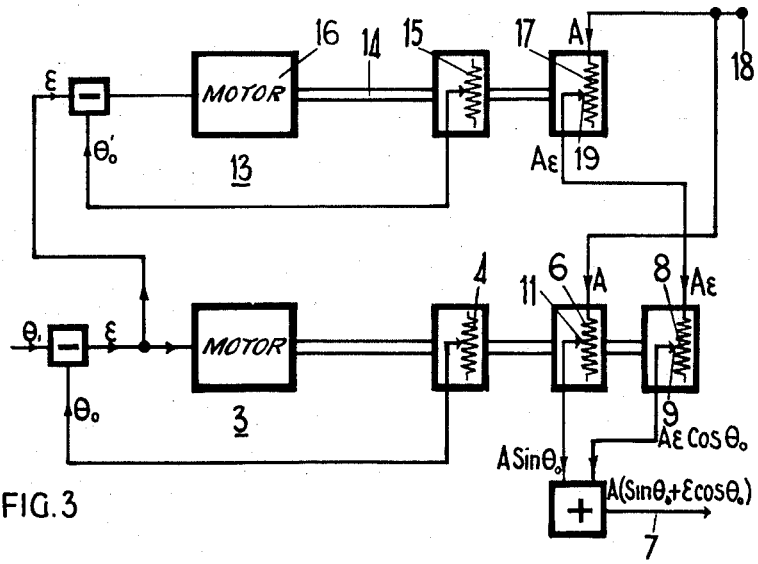

The apparatus of Figure 2 is derived from that shown in Figure 1 and the shaft 1 that is driven by the motor 5 now carries an addition potentiometer 8 that has a cosine characteristic. The voltage proportional to $\epsilon$ is supplied across this potentiometer 8 and the voltage derived from the tapping point 9 on this potentiometer is thus proportional to $\epsilon \cos \theta_0$. This voltage and the voltage proportional to $\sin \theta_0$ derived from the tapping point 11 of the potentiometer 6 are added together by a device 12 to provide the required output voltage.

A second arrangement in accordance with the present invention is required to supply an output voltage that is proportional to the product of the quantity A and $\sin \theta_1$. Referring now to Figure 3, this arrangement is similar to that described above with reference to Figure 2 since it again comprises a servo system 3 which is arranged to position three potentiometers 4, 6 and 8 in dependence upon the input angle $\theta_1$. In this case, however, an additional servo system 13 of the zero-error type is provided so that a shaft 14 is positioned in dependence upon the error $\epsilon$. This shaft 14 drives a potentiometer 15 that has a linear characteristic and provides the feed-back across the motor 16 and a potentiometer 17 that also has a linear characteristic. A voltage proportional to the quantity A is supplied to a terminal 18 and this voltage is thus fed across the potentiometers 6 and 17. The voltage developed at the tapping point 19 of the potentiometer 17 is thus proportional to $A\epsilon$ and this voltage is supplied across the potentiometer 8 with the result that the voltage developed at the tapping point 9 is substantially proportional to $A \epsilon \cos \theta_0$. The voltage developed at the tapping point 11 of the potentiometer 6 is proportional to the value $A \sin \theta_0$ so that the output voltage on the path 7 is approximately proportional to $$A(\sin \theta_0 + \epsilon_0 \cos \theta)$$

It will be appreciated that in the arrangement described above with reference to Figure 3, the servo system 13 is only required to position the shaft 14 in dependence upon the error voltage $\epsilon$ so that any error introduced by the servo system 13 has only a second order effect on the output voltage supplied over the path 7. The servo system 13 accordingly need not be so accurate or have such a fast speed of response as the servo system 3.

Alternatively, the servo system 13 may be arranged to position the shaft 14 in dependence upon the quantity A while a voltage proportional to $\epsilon$ is applied across the potentiometer 19. The voltage at the tapping point 19 is again substantially proportional to $A\epsilon$ and the choice between this arrangement and the one previously described depends on the relative rates of change of A and $\epsilon$.

It is well known that, if the co-ordinates of a point in a plane in a first system of cartesian co-ordinates are $A_x$ and $A_y$, then the co-ordinates $B_x$ and $B_y$ of that point in a new system of cartesian co-ordinates (the axes of which are inclined at an angle $\theta_1$ to those of the first system) are given by the expressions $$B_x = A_x \cos \theta_1 + A_y \sin \theta_1 \quad (4)$$

and $$B_y = A_x \sin \theta_1 - A_y \cos \theta_1 \quad (5)$$

Figure 4:
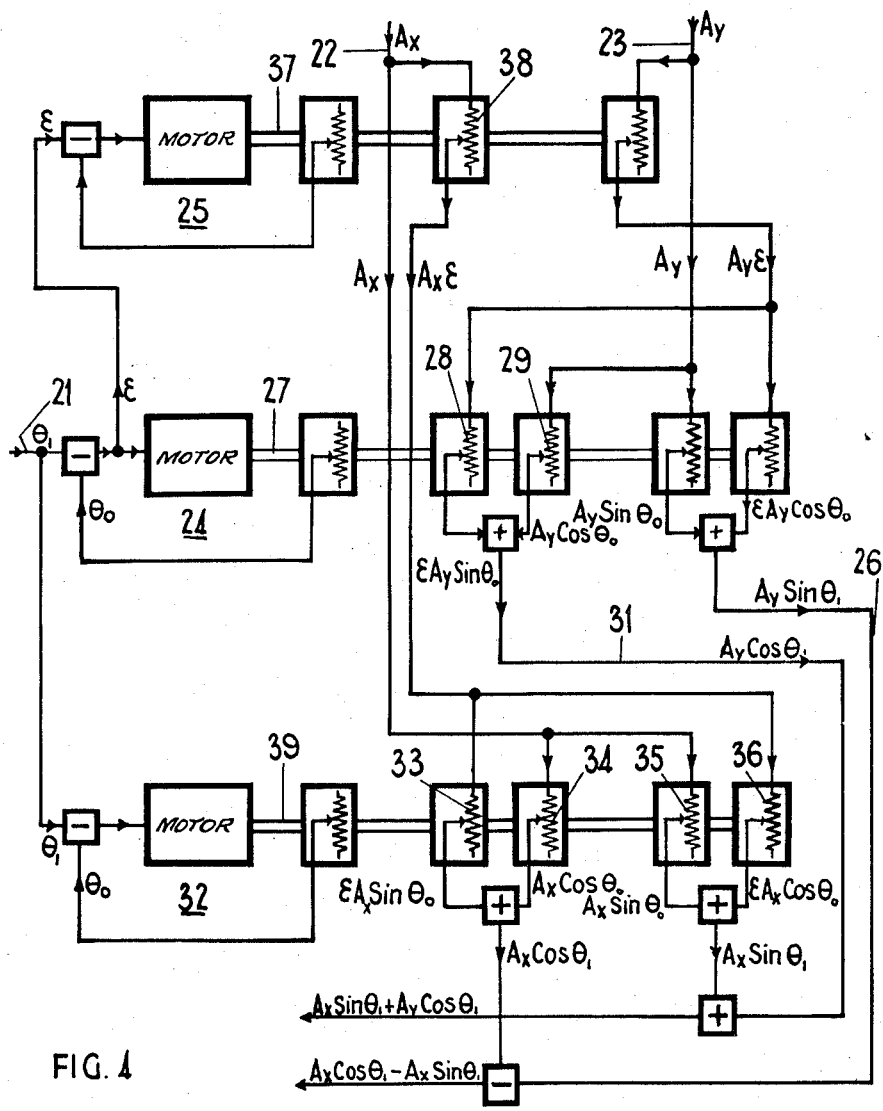

The arrangement described above with reference to Figure 3 may be extended to provide the co-ordinate transformations governed by the Expressions 4 and 5 as shown in the arrangement of Figure 4. In this arrangement the voltage proportional to $\theta_1$ is supplied over a path 21 while voltages proportional to $A_x$ and $A_y$ respectively are supplied over paths 22 and 23. In the manner described above with reference to Figure 3, a servo system 24 and an auxiliary servo system 25 are arranged to supply a voltage approximately proportional to $A_y \sin \theta_1$ over a path 26. In this case, however, the shaft 27 of the servo system carries two additional potentiometers 28 and 29 that have sine and cosine characteristics respectively. The voltages derived from the two potentiometers 28 and 29 are added together to give a voltage on a path 31 that is approximately proportional to $A_y \cos \theta_1$.

In addition a servo system 32 which is identical to the servo system 24 is arranged to drive four potentiometers 33, 34, 35 and 36 from which are derived voltages approximately proportional to $A_x \cos \theta_1$ and $A_x \sin \theta_1$. It will be noted that the shaft 37 driven by the servo system 25 carries a potentiometer 38 that has a linear characteristic for the purpose of deriving the voltage that is substantially equal to $A_x\epsilon$ which is supplied across the potentiometers 33 and 36. The voltage $\epsilon$ that controls the servo system 25 is of course the error voltage supplied by the servo system 24, but since the servo systems 24 and 32 are identical, it is assumed that the errors in the position of the shafts 27 and 39 at any instant are the same.

The four voltages, such as that supplied over the path 26, are added or substracted in pairs by the devices 39 and 40 to provide voltages proportional to the new co-ordinates.

Theoretically the servo system 32 may be omitted and the potentiometers 33 to 36 coupled to the shaft 27. In that case the servo system 24 would have to drive a relatively large number of potentiometers and in practice it is desirable to utilize the two servo systems 24 and 32 as described.

I claim:

1. Apparatus for deriving a voltage that is approximately proportional to the product of the quantity A and the sine of an angle $\theta_1$ comprising a first servo system of the zero-error type that is arranged to turn a first shaft to a position $\theta_0$ in dependence upon the input angle $\theta_1$, means to derive a quantity proportional to the error $\epsilon$ which is equal to $\theta_1 - \theta_0$, a second servo system which is arranged to turn a second shaft in dependence upon the quantity $\epsilon$, a first potentiometer which has a sine characteristic and which is arranged to be driven by the first shaft, a second potentiometer which has a cosine characteristic and which is arranged to be driven by the first shaft, a third potentiometer which has a linear characteristic and which is arranged to be driven by the second shaft, means for supplying a voltage proportional to the quantity A across the first potentiometer, means for supplying a voltage proportional to the quantity A across the third potentiometer, means for supplying the voltage derived from the third potentiometer across the second potentiometer, and means to add the voltages derived from the first and second potentiometers to give an output voltage approximately proportional to $A(\sin \theta_0 + \epsilon \cos \theta_0)$.

2. Apparatus according to claim 1 wherein the second servo system is of the zero-error type.

3. Apparatus for deriving a voltage that is approximately proportional to the product of the quantity A and the cosine of an angle $\theta_1$ comprising a first servo system of the zero-error type that is arranged to turn a first shaft to a position $\theta_0$ in dependence upon the input angle $\theta_1$, means to derive a quantity proportional to the error $\epsilon$ which is equal to $\theta_1 - \theta_0$, a second servo system which is arranged to turn a second shaft in dependence upon the quantity $\epsilon$, a first potentiometer which has a cosine characteristic and which is arranged to be driven by the first shaft, a second potentiometer which has a sine characteristic and which is arranged to be driven by the first shaft, a third potentiometer which has a linear characteristic and which is arranged to be driven by the second shaft, means for supplying a voltage proportional to the quantity A across the first potentiometer, means for supplying a voltage proportional to the quantity A across the third potentiometer, means for supplying the voltage derived from the third potentiometer across the second potentiometer, and means to add the voltages derived from the first and second potentiometers to give an output voltage approximately proportional to $A(\cos \theta_0 + \epsilon \sin \theta_0)$.

4. Apparatus according to claim 3 wherein the second servo system is of the zero-error type.

References Cited in the file of this patent

UNITED STATES PATENTS

| | | |
|---|---|---|
| 2,455,974 | Brown | Dec. 14, 1948 |
| 2,471,315 | Dehmel | May 24, 1949 |
| 2,894,685 | Spencer et al. | July 14, 1959 |

OTHER REFERENCES

Electronic Engineering (article by MacKay), July 1949, vol. 21, London, England.

Ragazzini et al.: "Analysis of Problems in Dynamics by Electronic Circuits," Proc. of IRE, vol. 35, No. 5, May 1954, pages 450–451.

Frost: "Compact Analog Computer," Electronics, vol. 21, No. 7, pages 116–120 and 122.